United States Patent
Amerpohl et al.

(10) Patent No.: US 6,677,528 B2
(45) Date of Patent: Jan. 13, 2004

(54) CABLE TERMINAL

(75) Inventors: Uwe Amerpohl, Bergisch Gladbach (DE); Wolfgang Belz, Cologne (DE); Gerhard Haupt, Cologne (DE); Bernhard Schindler, Troisdorf (DE)

(73) Assignees: ntk cables group GmbH (DE); Tyco Electronics Raychem GmbH (DE)

( * ) Notice: Subject to any disclaimer, the term of this patent is extended or adjusted under 35 U.S.C. 154(b) by 0 days.

(21) Appl. No.: 10/182,320

(22) PCT Filed: Feb. 9, 2001

(86) PCT No.: PCT/EP01/01427
§ 371 (c)(1), (2), (4) Date: Jul. 26, 2002

(87) PCT Pub. No.: WO01/59902
PCT Pub. Date: Aug. 16, 2001

(65) Prior Publication Data
US 2003/0022556 A1 Jan. 30, 2003

(30) Foreign Application Priority Data
Feb. 9, 2000 (DE) .......................... 100 05 703

(51) Int. Cl.[7] .............................................. H02G 15/02
(52) U.S. Cl. .................. 174/73.1; 174/74 R; 174/138 F
(58) Field of Search .............................. 174/73.1, 74 R, 174/138 F, 80, 93, 154

(56) References Cited

U.S. PATENT DOCUMENTS

| | | | | |
|---|---|---|---|---|
| 1,168,019 A | * | 1/1916 | Liversidge ................ | 174/75 R |
| 2,498,589 A | * | 2/1950 | Steinke ..................... | 439/322 |
| 3,652,782 A | * | 3/1972 | Furusawa et al. .......... | 174/73.1 |
| 3,954,762 A | * | 5/1976 | Helm ........................ | 544/402 |

FOREIGN PATENT DOCUMENTS

| | | |
|---|---|---|
| EP | 0 683 555 | 11/1995 |
| EP | 000683555 | * 11/1995 |
| FR | 2 547 451 | 12/1984 |
| WO | WO 98/45917 | * 10/1998 |

OTHER PUBLICATIONS

International Search Report—PCT/EP01/01427, ISA/EPO, May 18, 2001.

* cited by examiner

*Primary Examiner*—Dean A. Reichard
*Assistant Examiner*—Jinhee Lee
(74) *Attorney, Agent, or Firm*—Harness, Dickey & Pierce, P.L.C.

(57) ABSTRACT

An outdoor terminal is mounted at one end on a pylon. A base armature is provided fastened to a cable with an electrical feedthrough to the interior of the terminal. The cable terminal is electrically connected to a ground potential and includes a field control element and isolations at inhomogeneous potential transitions on the cable end. The electrical feedthrough is configured as a tube or a pin and is connected to the cable conductor via contract elements. The feedthrough, the insulators and the head armature form one assembly unit.

11 Claims, 3 Drawing Sheets

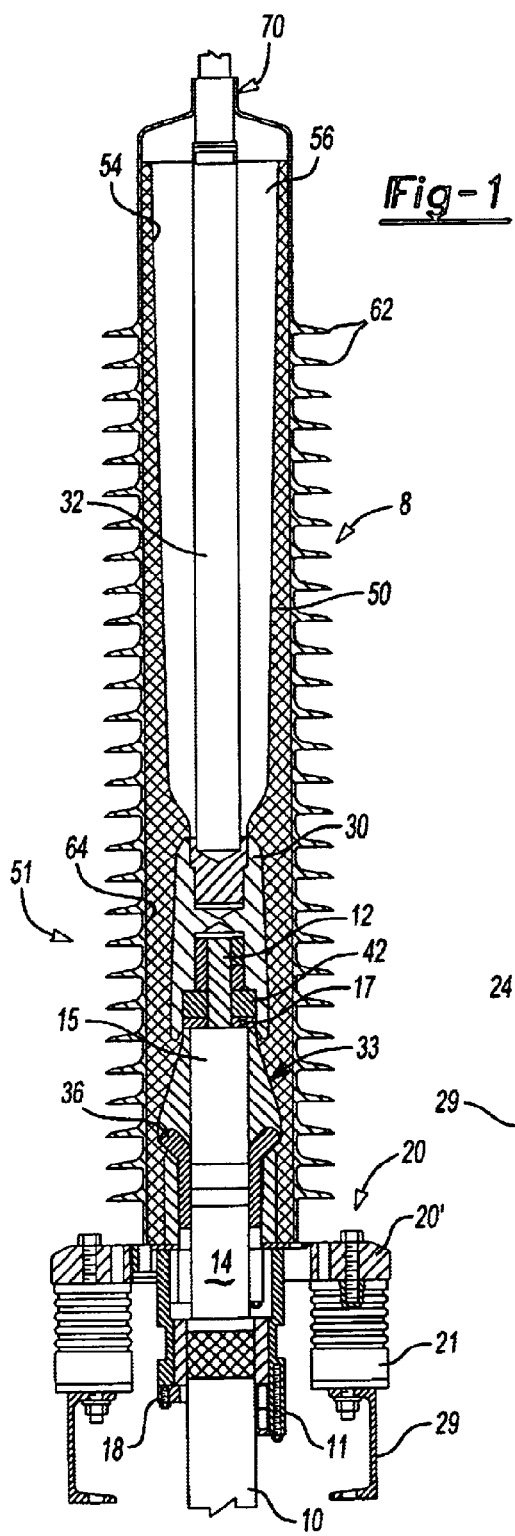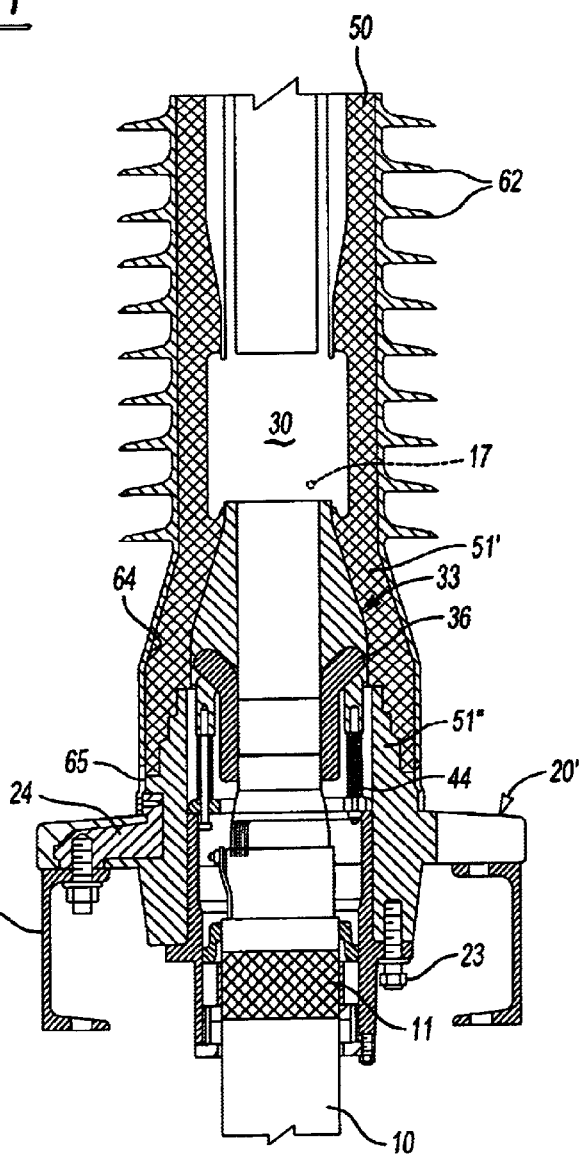

CABLE TERMINAL

FIELD OF THE INVENTION

The invention relates to a cable terminator, preferably an outdoor terminator for high voltage.

BACKGROUND OF THE INVENTION

Various types of terminators are known. Older designs are formed with porcelain insulators and an oil or other chemical filling. Such terminators have the disadvantage that they are not very robust mechanically, and no longer fulfil present-day environmental protection conditions with regard to possible substance leakage. A terminator without oil filling is described in EP 667 665 B1. A special feature of this terminator is a rigid conducting element which is designed to take up the lateral forces. The forces are carried awayfrom the overhead conductor connection via the rigid conducting element, via a base body with a field control and insulating device, to the bearing structure. The weak point of this arrangement is the transition tram the conducting, rigid element to the base body.

An object of the invention is to propose a cable terminator, preferably a high-voltage outdoor terminator, which can be produced at low cost, is mechanically stable and entirely satisfies the mechanical requirements.

SUMMARY OF THE INVENTION

A terminator is mounted at one end on a base fitting, preferably for fastening to a cross-arm. Means for fastening the cable are formed on the base fitting and have an electrical duct tube or pin inside the terminator. Situated at a top fitting are means for fastening to the pin. Means for electrically connecting the cable shield to ground potential and means for the field control and insulation at the inhomogeneous potential transitions at the cable end are present.

The insulating body generally bears on its surface an elastomeric material (preferably of silicone rubber) with a ribbed surface (shielding plates). The length and in particular diameter of the insulating body is to be chosen such that the demands for sufficient insulation and avoidance of atmospheric flashovers at full operating voltage are met. This requirement can be fulfilled by covering the surface of the insulating body with a resistive or refractive control coating.

The insulating body is fastened to the base fitting. The further, customary means for electrically connecting the cable shield to ground potential and means for the field control (field control bodies) and insulation at the inhomogeneous potential transitions at the cable end are employed. On the fastening to the base fitting, voids present between the cable end and the field control and insulating elements are closed by mechanical bracing with the base fitting.

The insulating body is filled up with material from the region of the fastening to the base fitting up to the level of the contact elements, and that the filling is reduced towards the top fitting, with the result that an internal cavity is formed.

The three parts consisting of electrical duct with contact elements, insulating body and top fitting are produced separately. The top fitting consists essentially of an electrically conductive end plate and an overhead conductor connection piece, in which a thread may be incorporated for the fastening of a carrying lug. The electrical duct, designed as a tube or as a pin, is preferably fastened inside the end plate in a welding operation (or by another firm mechanical connection). The insulating body, consisting of insulating material, is bonded into the top fitting. The unit, also referred to as assembly unit, is lifted by a crane at a carrying lug into the assembly position and lowered from above over the prepared lower part of the terminator. The dimensions of the parts in the lower region of the assembly unit are designed such that upon assembly they slide in a self-centering manner into the base structure on the base fitting. In the process, the electrical duct also comes into contact with the cable conductor via contact elements.

A cable plug system is preferably employed for the contact receptacle; the latter may be fastened to the cable conductor with screws. The electrical contact to the electrical duct is provided by contact laminations. This plug connection is not designed to take up the forces on the terminator. In the present arrangement, the insulating body is therefore constructed and dimensioned so as to be able to take up all the mechanical forces. The plug relieved of mechanical loads. A typical magnitude of the transverse force to be expected is 5 kN, so that the mechanical design is to be dimensioned for this characteristic quantity.

The insulating body is produced from cast resin or another suitable material. It may be materially strengthened, for example with glass fibers. The insulating body is completely filled up with material from the bottom edge up to the level of the contact elements. A cavity is preferably formed in the interior of the insulating body. The cross-section of the cavity (the space filling) may be linear or be reduced in a curve in the shape of a tunnel towards the top fitting. The form of the cavity allows the weight to be kept low, the wall thickness may not be reduced further than a point where the bending forces can be taken up. In a preferred design, the inner surface of the cavity is lined with a conductive coating.

BRIEF DESCRIPTION OF THE DRAWINGS

Embodiments of the outdoor terminator are illustrated in the figures, in which, specifically:

FIG. 1 shows a first embodiment with constant outside diameter;

FIG. 2 shows another embodiment with stepped outside diameter;

DETAILED DESCRIPTION OF THE PREFERRED EMBODIMENTS

Figure 3:
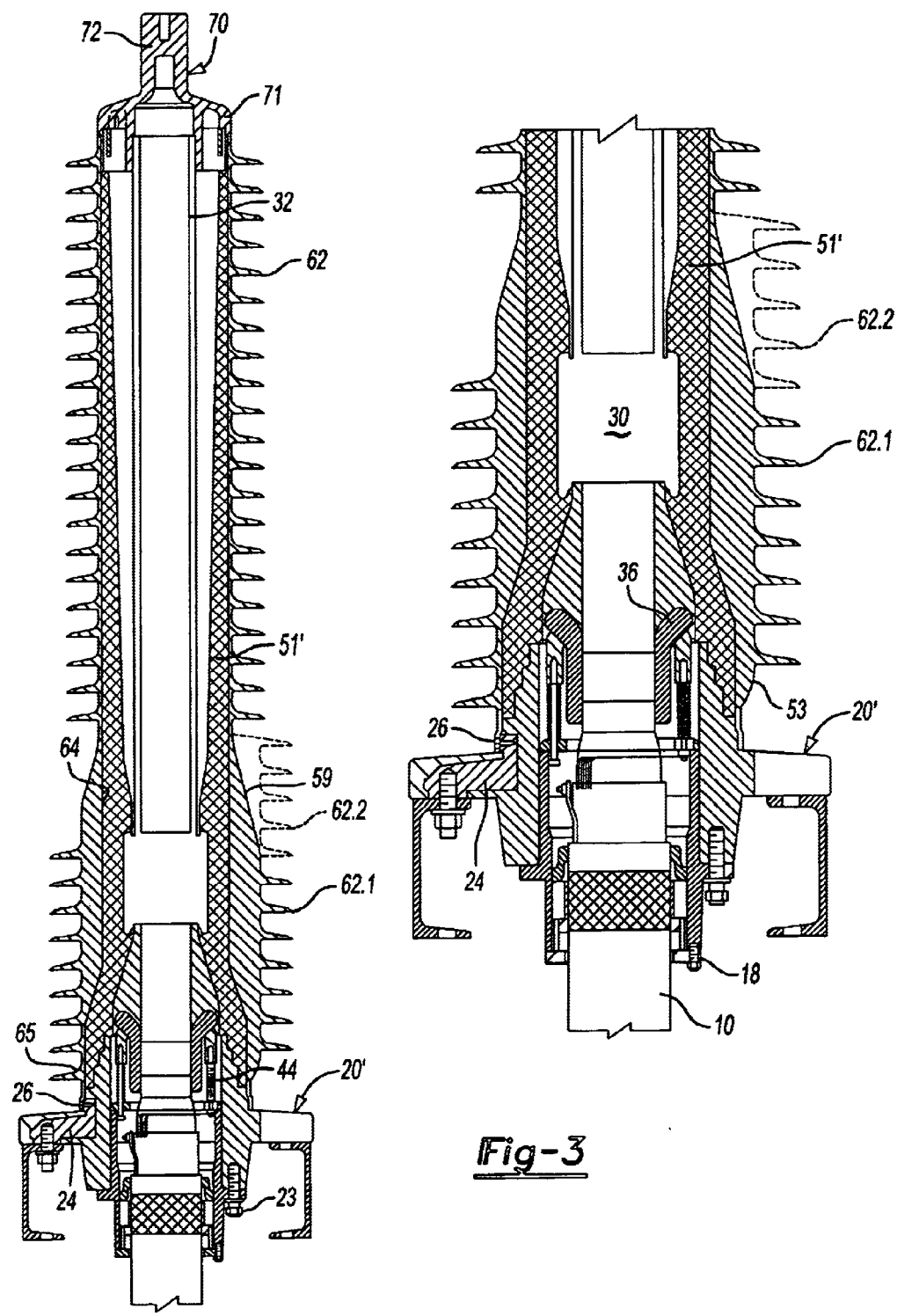
FIG. 3 shows an embodiment with different external contours in the right-handed and left-hand half of the figure.

The terminator according to the invention—for example for a rated voltage of 145 kV and having a conductor cross-section of 1200 $mm^2$-comprises an insulating body 50, preferably made of cast resin, which has a cavity 56 in its interior. In the lower region 51, it can be seen that at the end of the cable core (conductor 12 and conductor insulation 15) the arrangement of the field control element 36 and insulating by 50 is designed in accordance with the structure known to a person skilled in the art.

The field control body 33 consists of silicone rubber and its control element 36 lies on the transition region between the conductor insulation 14 and the end of the conductive layer 15. The insulating body 50 has a cylindrical external profile. The insulating body 50 has, in the upper region, a constant outside diameter over its length. In the lower region 51, it accommodates the field control body 33 and is screwed onto the base part 20-flange 20'. A cavity 56, the inner surface 54 of which is designed to be electrically conductive, is formed in the upper region of the insulating body 50, in its interior. Admission of air to the cavity 56 is possible.

The insulating body 50 is screwed, in the base part having a base plate or a flange 20', onto a supporting frame 29, for example a cross-arm, via insulating supports 21. Alternatively, the lower region 51 of the insulating body 50 may also be formed as a cast body which fits in mating fashion into the flange 20'.

A high-voltage cable 10 is led into the lower region of the outdoor terminator 8. The shielding wires 11 of the cable 10 are in electrical contact with the flange 20' of the base part 20, which is mounted via insulators 21 on a arm 29 of a pylon.

As mentioned, the diameter of the insulating body 50, in particular in the lower region 51 (see also reference numeral 53 in FIG. 3), is dimension such that the external field strength in all operating states is below critical values. Owing to the installation of the field control elements 36, a relatively large diameter is required. However, the diameter above the field control region may be reduced. But this presupposes that the shielding plates 62 follow the conical or stepped contour. The forming costs for shielding plates 62 with a contour which varies over its length are high, however, so that an arrangement with a constant cross-section over the entire length of the insulating body 50 is preferred.

As shown in FIG. 2, for example, the insulating body 50 may consisting of two parts (51', 51") bonded together and with different material qualities. The lower part 51" (fastening to the base fitting up to the level of the contact elements on the cable conductor) is -without being covered with shielding plates 62—exposed to the environment; this part must be suitable for outdoor use. The part 51' may consist of a simple material, since this region is always covered with shielding plates 62. For an embodiment such as in FIG. 3 having shield plates 62.1 down to the base fitting, there is likewise an outer protective covering, so that a simple material quality of the insulating body 50 may b employed for this region too.

The external contour 59 of the insulating body is preferably cylindrical over the entire length. It is covered with shields 62 made of RTV or LSR silicone rubber. The outer surface under the shields 62 may preferably be covered with a field-controlling coating 64. Depending on the form, quality and presence of this coating 64, the insulating body 50 may be designed with different diameters (greater at the bottom and decreasing at the top and a conical transition therebetween) (see FIGS. 2 and 3). The coating 64 may be applied in varying thicknesses for an optimum controlling effect.

The inner surface 54 of the cavity 56 may be designed to be conductive. It may be produced by conductive lacquer, conductive plasma coating, metal foil (sheet), metallization or metallic cloth embedded in resin. The surface 54 is at high-voltage potential. The advantage of this design is that, even in the event of condensation of water in the cavity 56, the electrical reliability remains guaranteed, since the electrical field conditions are uniform given the high-voltage potential present.

The contact 17, embedded in the cast-resin body 50, embraces the end contact 30 at the lower end of the tube or pin 32 capable of carrying current. The pin 32 runs up to the top fitting 70 and is fastened there. A mechanically and electrically leaktight end cover 71 is fitted in the upper region of the terminator 8.

The connection between cable conductor 12 and electrically conductive pin 32 is arranged at the transition from the full-volume base body in the lower region 53 to the cavity 56. The connector 30 clamps the uncovered cable conductor 12 in the lower part. The current flows from the cable conductor 12 via the contact 17 to the pin 32. For this purpose, slidable contact or clamping elements are preferably provided between cable conductor 12 and electrical pin 32. The transition between connector 30 and contact laminations 42 may be sealed by means of an O-ring.

In the right-hand half of FIG. 3 there is an embodiment of the insulating body 50 having a slightly convex thickening in the lower region 53. The metal ring 26, used for ground connection, can still be used in this design with an unchanged diameter. Shielding plates 62.1, 62.2 may be present in the convex region 53.

Figure 4A:
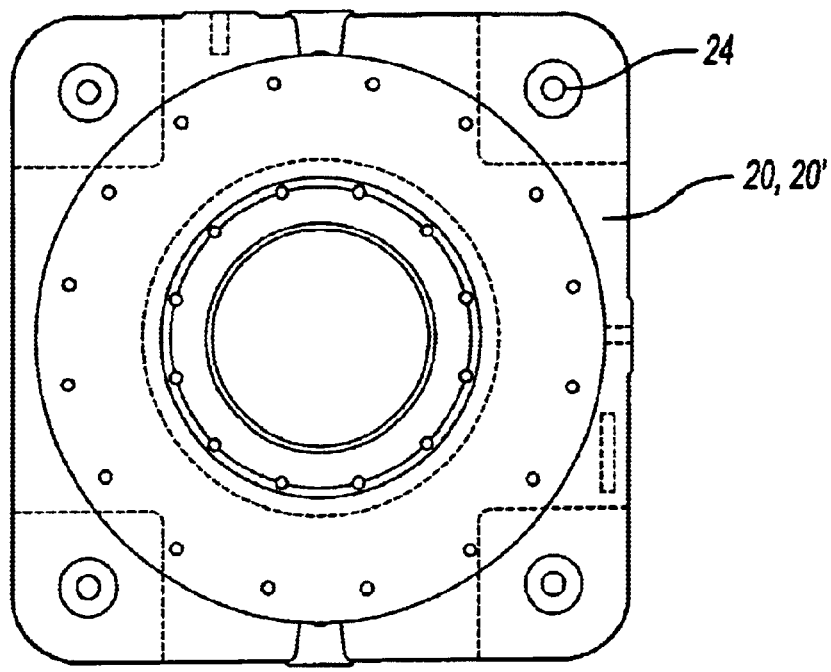
FIG. 4 shows two flange designs.
Figure 4B:
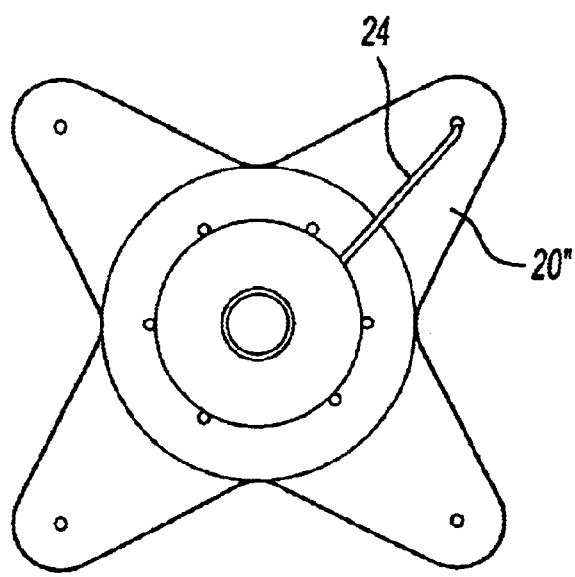

The two FIGS. 4A and 4B show different forms of a flange 20', 20". The fastening the insulating body 50 to the flange 20', 20" is effected using a plurality of screw connections 23 (FIG. 2 and FIG. 3). By tightening the screws 23, assembly unit mentioned is braced via the spring elements 44 (see FIG. 3), so that voids present in the region of the field control body 33 are completely closed. Reference numeral 24 (FIG. 3) indicates a conductive connection of the surface of the insulating body 50, adapted for ground connection, to the cross-arm 29. Attached to the foot of the insulating body 50 is a metal ring 26. The metal ring 26 is brought into contact with the ground conductive connection 24 (see FIG. 3) via a screw 23.

What is claimed is:

1. A cable terminator, in particular an outdoor terminator for an electrical cable comprising a cable conductor, a cable insulation, a conductive layer and a cable shield providing a ground potential; the terminator being mounted at one end on a base fitting, having an electrical duct in the interior of the terminator, having a top fitting, having a field control body for the potential transitions at the end of the cable, having an insulating body fastened to the base fitting; the electrical duct being connected to the cable conductor via slideably clamping contacts; said electrical duct, the insulating body and the top fitting forming a unit for assembly, and in that the insulating body holds said contacts and takes up mechanical load on the terminator.

2. The cable terminator according to claim 1, characterized in that the insulating body is filled up with material from the base fitting up to the level of the contacts, and in that the filling is reduced towards the top fitting, such that an internal cavity is formed.

3. The cable terminator according to claim 2, characterized in that the insulating body is produced from cast resin.

4. The cable terminator according to claim 1, characterized in that the contacts are laminated.

5. The cable terminator according to claim 4, characterized in that the surface of the insulating body is coated with a field-controlling coating.

6. A cable terminator comprising: a base fitting through which an end of the cable passes; a top fitting; an elongated insulating body connected between the base fitting and the top fitting; a conductive member extending downwardly from the top fitting through a cavity in the insulating body; a connector embedded in the insulating body located between lower portions of the cavity and the base fitting, said connector providing slideable clamping connection between the cable end and the conductive member; with said insulating body holding the connector and taking up mechanical load on the terminator.

7. The cable terminator of claim 6 which further comprises:
    a metallized coating on inner wall of the insulating body defining the cavity, said coating extending from the connector to the top fitting.

8. The cable terminator of claim 6 wherein the insulating body has a cylindrical profile from the base fitting to the top fitting.

9. The cable terminator of claim 9 which further comprises:
    shielding plates having a substantially constant cross section on outer portions of the insulating body.

10. The cable terminator of claim 6 wherein the cavity tapers radially outwardly from the connector to the top fitting.

11. The cable terminator of claim 6 wherein the insulating body is made from resinous material.

* * * * *